May 20, 1958 — M. M. DI GIOVANNI — 2,835,772
MOTION SENSING DEVICE
Filed July 2, 1956 — 4 Sheets-Sheet 1

INVENTOR
MARIO DiGIOVANNI
BY
ATTORNEY.

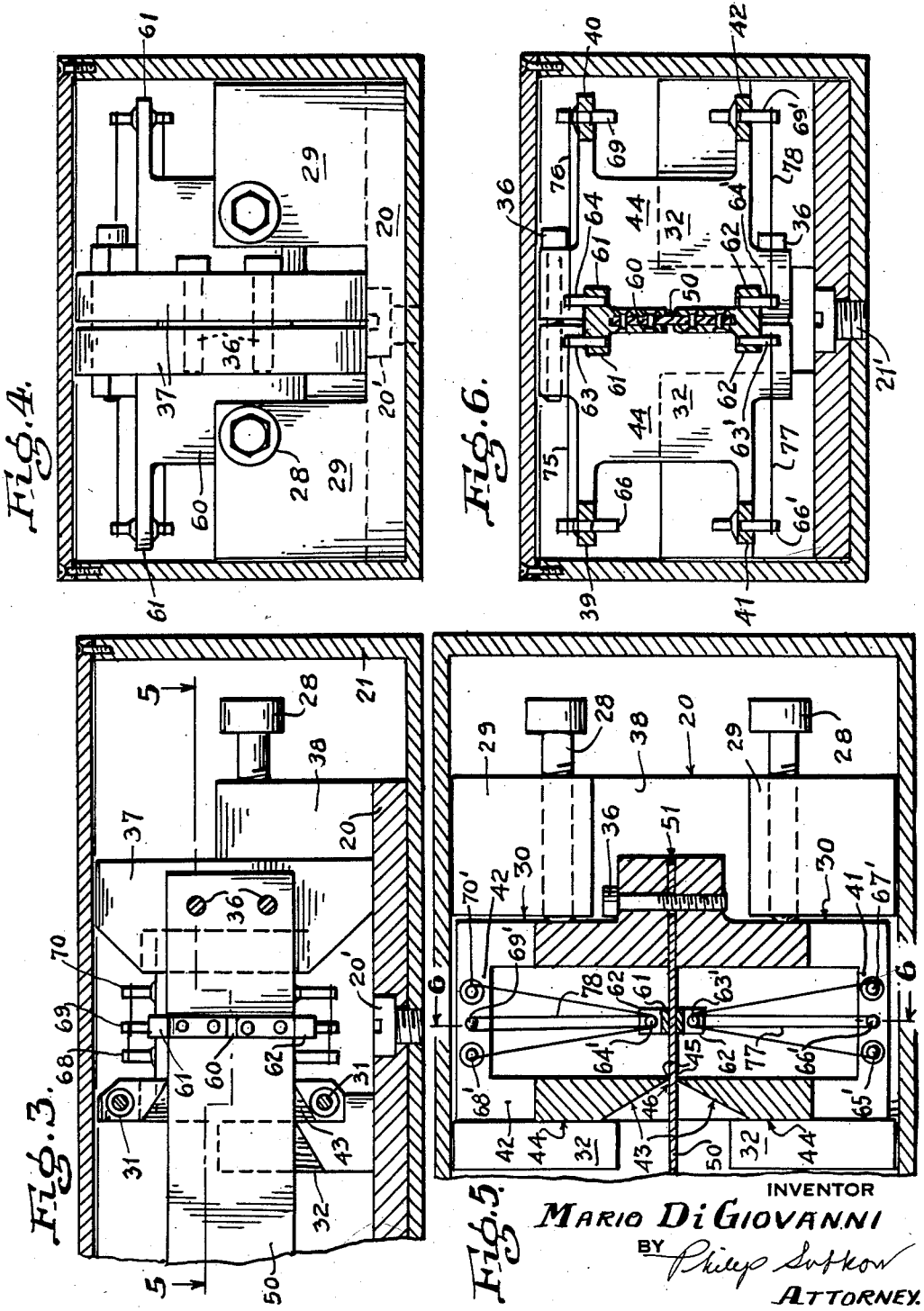

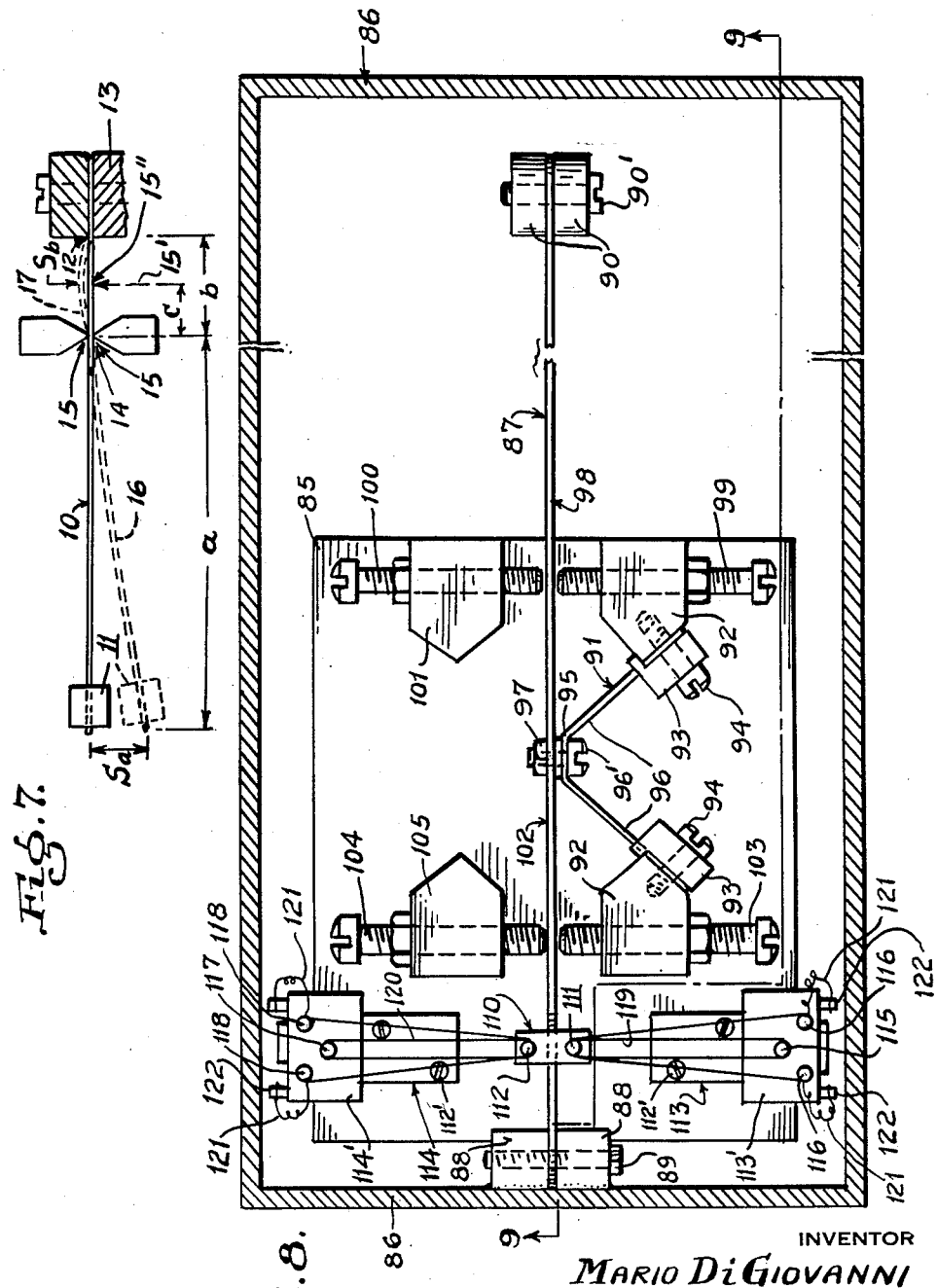

May 20, 1958 M. M. DI GIOVANNI 2,835,772
MOTION SENSING DEVICE
Filed July 2, 1956 4 Sheets-Sheet 4
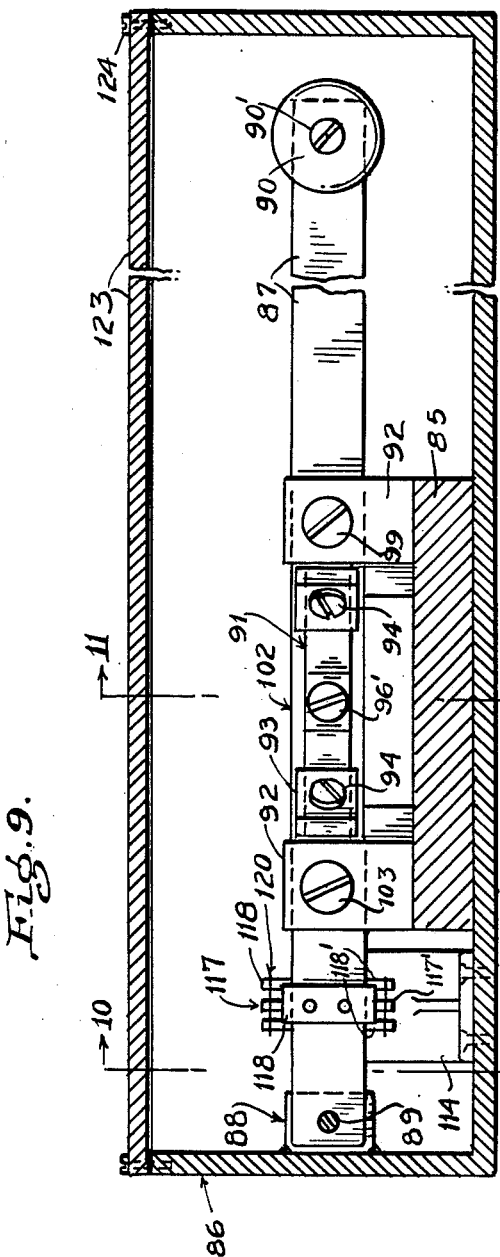
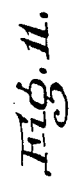
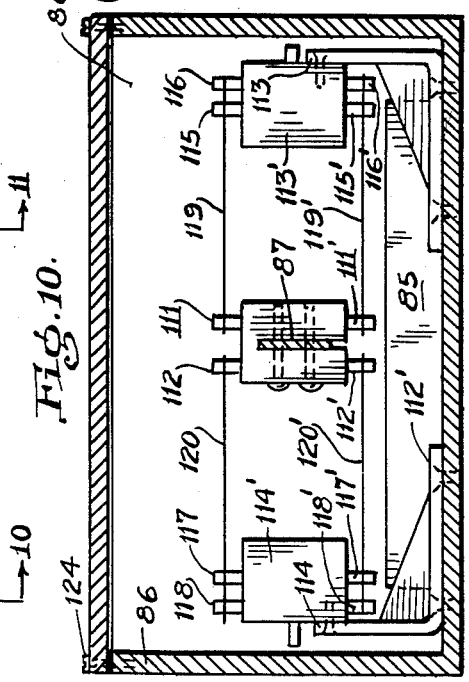
INVENTOR.
*Mario Di Giovanni*
BY
*Philip Sutkow*
ATTORNEY.

United States Patent Office 2,835,772
Patented May 20, 1958

2,835,772

MOTION SENSING DEVICE

Mario M. De Giovanni, Pacific Palisades, Calif., assignor to Statham Instruments, Inc., a corporation of California Application July 2, 1956, Serial No. 595,447

10 Claims. (Cl. 201—48)

This application is a continuation-in-part of my co-pending U. S. applications Serial Nos. 515,111, 515,112 now abandoned and 515,196, all filed June 13, 1955, the latter application now abandoned.

The instant invention relates to a transducer such as a motion sensing device, displacement meter, accelerometer, and other transducers, and more particularly concerns instruments for measuring movements, forces, accelerations, and the like. Thus, for example, one embodiment of the invention is concerned with an accelerometer incorporating a wire resistance strain gauge of the so-called unbonded type.

Unbonded strain gauges are generally composed essentially of a strain sensitive wire connected to two supports which are subject to separation under an applied force. When subjected to tension the wire changes in dimensions, and therefore changes in resistance. Means are provided for measuring the resulting change in resistance which is then translatable into a measurement of the applied force. Such gauges have found a wide application in industry.

In my above co-pending applications I have disclosed a transducer comprising a flexible beam supported intermediate its ends on a flexible support or flexure, and a motion sensing means such as a strain wire gauge associated with the outer end of the beam beyond said flexible support. The transducer, e. g., in the form of a pressure gauge, dynamometer or accelerometer, comprises a frame, and the flexible support or flexure member is connected to said frame and to said flexible beam at spaced points intermediate the ends of said beam and at an angle thereto, to provide spaced and localized points of bending in said flexure member intermediate the ends of said beam. Means, e. g., in the form of a pressure chamber or rod, is provided for applying a force to said beam to produce a deflection of said beam on said flexure member at points between the flexure member in a direction opposite to the direction of deflection of said beam at points beyond said flexure member.

This invention is particularly useful in connection with the application of electrical resistance strain wire transducers in which the application of a load varies the strain in a fine wire resulting in a change in resistance which is proportional to the strain induced in the wire. Such transducers have been applied to accelerometers as is illustrated in the Statham Patent No. 2,753,285 issued October 30, 1951. In such systems the spring constant and permissible magnitude of strain which may be induced in the strain wire determines the natural frequency, and the number of wires and their spring constant determine the mass that must be employed to obtain the desired displacement on application of the accelerating force.

Since in such transducers the values of the strain wires employed place a practical limit on the permissible strain which may be developed in the fine wires which are used in such strain wire transducers, the wires must be made either excessively long or one is forced to accept a relatively larger value of the natural frequency.

Modern instrumentation requires that the accelerometers be made very small. Such size limitations impose a restriction on the permissible length of the strain wires and also impose a restriction on the permissible mass of the inertial element, thus resulting in accelerometers having relatively high values of their natural frequency and small permissible displacements of their inertial masses.

Another consequence of this design is that in order to reduce the natural frequency and increase the permissible displacement, the weight of the inertial mass must be made relatively larger and a sufficient multiplicity of wires must be looped between the mass on the frame on which the mass is suspended in order that the desired displacement be obtained within the limits of the permissible strain on the wire.

One object of this invention is the provision of a motion sensing device comprising a force summing member connected to a motion sensing means in which a movement of the force summing member is transmitted as a movement to the motion sensing means, preferably in the form of a strain wire gauge, the movement of the motion sensing means being smaller, the same as, or larger than the movement of said force summing member.

It is another object of my invention to design an accelerometer in which an inertial mass is connected to an electrical strain wire transducer and in which the displacement of the mass may be made independent of and different from the variation in extension of the wire resulting from the displacement of the mass.

It is another object of my invention to design an accelerometer having a mass suspended on a yieldable suspension whereby the movement of the mass is sensed by an electrical strain wire transducer, so that a motion of the mass on acceleration causes a variation in extension of the strain wires.

A still further object of the invention is the provision of a motion sensing device or accelerometer including a strain wire transducer, and wherein the displacement of the mass is substantially greater than the extension of the strain wire due to said displacement.

Other objects and advantages of the invention will appear hereinafter.

The foregoing objects and results are realized according to the invention by connecting a force summing member, e. g., a mass, preferably adjacent one end of a beam which is freely flexible, fixing or clamping the other end of the beam so that it is not subject to deflection at such locality, and pivoting the beam on a support at a point intermediate its ends. A motion sensing means is connected to the beam between the pivot and the clamped end of the beam. The pivot should be a point of load reaction which does not introduce a moment to effectively restrain bending of the beam on both sides of the intermediate load reaction point, so that the beam flexes on both sides of the pivot and is not clamped so as to prevent rotation at such point. To produce this effect, the force summing member can be positioned a distance from the pivot point of the beam, substantially equal to, less than or greater than the distance between said pivot point and the fixed or clamped opposite end of said beam. Thus, for example, where the device is in the form of an accelerometer employing an inertial mass, and the distance between the the mass and the pivot is greater than the distance between the pivot and the fixed end of the beam, flexure of the beam as a result of a force inducing a movement of the mass will produce a displacement of the mass and of the beam between the mass and the beam pivot point, which is greater than the maximum displacement of the beam along the shorter portion thereof between the pivot point of the beam and its fixed or clamped end. If a strain wire is connected to the beam between its fixed or clamped end and the pivot point thereof, such wire will be strained to a smaller degree than the magnitude of the displacement of the mass permitted through flexure of the beam. Instead of connecting a mass to the outer free end of the beam, it is understood that any force summing member may be employed.

The invention will be more clearly understood from the description below taken in connection with the accompanying drawings, wherein:

Fig. 3 is a sectional view taken on line 3—3 of Fig. 1;

Fig. 4 is an end elevation taken on line 4—4 of Fig. 1;

Fig. 5 is a horizontal sectional view taken on line 5—5 of Fig. 3;

Fig. 6 is a section taken on line 6—6 of Fig. 5;

Fig. 7 is a schematic illustration of the basic principles of the invention;

Fig. 8 is a plan view of a modification of the invention device;

Fig. 9 is a broken sectional view taken on line 9—9 of Fig. 8;

Fig. 10 is a section taken on line 10—10 of Fig. 9; and

Fig. 11 is a section taken on line 11—11 of Fig. 9.

Figures 1, 2:
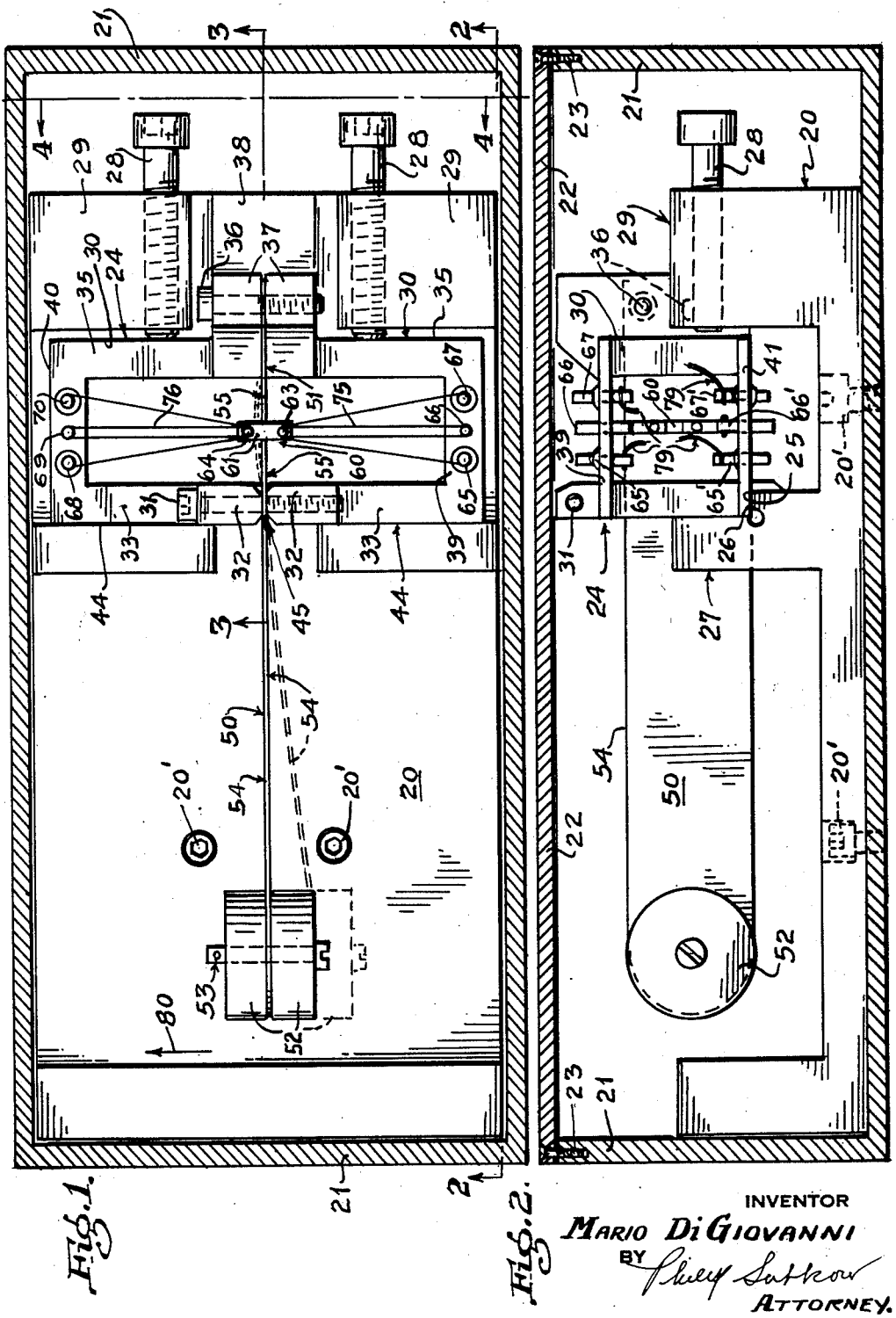
Fig. 1 is a plan view of a preferred embodiment of the invention.
Fig. 2 is a side elevational view taken on line 2—2 of Fig. 1.

Referring first to the schematic showing in Fig. 7, a flexible beam 10 having a mass 11 at one end is clamped at its other end 12 in a rigid clamping member or support 13. The beam 10 is pivoted at 14, a point intermediate its ends, by passage of the beam through a narrow space between knife edges 15. It is noted in this illustration that pivot point 14 is substantially closer to the clamped end 12 of the beam than to the mass 11 at the opposite end of the beam. A strain wire indicated at 15' is connected to the beam at a point 15'' substantially midway between pivot point 14 and the clamped end 12 of the beam, the wire extending in tension transversely of the beam.

Any displacement $S_a$ caused by a force acting on weight 11 will cause the beam to flex on both sides of the pivot 14, as indicated by the dotted lines, so as to form a large curved portion 16 between the weight 11 and pivot point 14, and a small curved portion 17 between pivot 14 and clamp 13. Such large displacement $S_a$ will induce a substantially reduced displacement $S_b$ at the maximum point of displacement of the small portion 17 of the beam 11, which is essentially at the point of connection 15'' of strain wire 15'. It is thus seen that the large displacement $S_a$ of the mass produces a much smaller extension of the strain wire 15', corresponding to the displacement $S_b$.

It will be further noted that the displacement of the mass may be made as large as practical, yet the amount of extension or stretching of the strain wires can be kept within the small limits desired. Thus, according to this embodiment the ratio $$\frac{S_a}{S_b}$$

can be made as large as possible simply by varying the dimensions $a$, $b$ and $c$, assuming constant modulus of the beam, constant moment of inertia of the section of flexure of the beam and constant moment at the knife edges, $a$ being the distance between mass 11 and pivot 14, $b$ the distance between pivot point 14 and the clamp 13, and $c$ the distance between pivot point 14 and the point of connection 15'' with strain wire 15'. For example, in one embodiment of the invention, I can employ a displacement ratio $$\frac{S_a}{S_b} \text{ of } \frac{.75}{.0015} = 500$$

However, this ratio can be increased or decreased according to my invention.

Referring now to Figs. 1 to 6 showing a preferred embodiment of the invention, frame 20 is mounted by suitable means such as by screws 20' in a case 21 having a cover 22 removably positioned on the case by means of screws 23. A cradle 24 is seated along a bottom edge 25 thereof on the horizontal shoulder 26 of a stepped block 27 integrally connected to the bottom of frame 20 intermediate its ends. The cradle is held in fixed position by means of screws 28 passing through a second block 29 integral with the bottom of frame 20, the ends of the screws abutting a side 30 of the cradle.

Cradle 24 is composed of a pair of symmetrical half sections 35 which are held together by screws 36 passing through a flange 37 integrally connected to side 30 of each of these half sections at adjacent ends thereof, said flanges being disposed in a recess 38 formed in the center of end block 29, and by a screw 31 passing through adjacent lugs 32 each integral with the upper surface 33 of the front side 44 of each of half sections 35. The cradle includes a pair of upper cross pieces 39 and 40 and a pair of lower cross pieces 41 and 42. A wedge shaped recess 43 (see particularly Fig. 5) is formed at the inner end of the front side 44 of the cradle half sections 35, the adjacent inner ends of the adjacent wedges forming knife edges 45, separated by a narrow slot 46.

Clamped between the flanges 37 of the cradle 24 and held by the screws 36 is one end 51 of a flat elongated spring or cantilever beam 50, the beam having a thickness just sufficient to permit it to pass through the narrow space 46 between knife edges 45 so that opposite sides of the beam 50 are in contact with said knife edges. Beam or cantilever 50 extends longitudinally outward with a mass 52 connected to its outer end by means of a fastener 53. It is accordingly seen that on acceleration of the instrument in a direction upward or downward as viewed in Fig. 1, the outer portion 54 of cantilever beam 50 between mass 52 and the knife edges 45 will be deflected upward or downward from the pivot points 45, while the short inner portion 55 of the cantilever beam between knife edges 45 and the clamped end 51 of the beam will be deflected in the opposite direction.

Connected to the center of the short inner portion 55 of cantilever beam 50 is a post 60 having outwardly extending ears 61 at its top and similar outwardly extending ears 62 at its bottom (note especially Fig. 6). A pair of insulated pins 63 and 64 are mounted on the upper ears 61 and a pair of insulated pins 63' and 64' are mounted on the lower ears 62 in alignment with pins 63 and 64, respectively. Mounted on the upper cross piece 39 of the cradle is an insulated pin 66 and two terminals 65 and 67, pin 66 being in transverse alignment with pins 63 and 64, with respect to the axis of beam 50, and mounted on the opposite upper cross piece 40 is an insulated pin 69 and two terminals 68 and 70 in transverse alignment with members 66, 65 and 67, respectively. On the lower cross piece 41 directly below pin 66 and terminals 66 and 67, is mounted pin 66' and two terminals 65' and 67', respectively, and pin 69' and terminals 68' and 70' are mounted on the opposite lower cross piece 42 directly below pin 69 and terminals 68 and 70, respectively.

A strain wire 75 is looped in tension around pins 63 and 66, the ends of the wires being connected to terminals 65 and 67; strain wire 76 is looped in tension between pins 64 and 69, the ends of the wire being connected to terminals 68 and 70; a third strain wire 77 is similarly looped between pins 63' and 66' the ends of the wire being attached to terminals 65' and 67'; and a fourth strain wire 78 is looped in tension between pins 64' and 69', the ends of the wire being attached to the terminals 68' and 70'. The terminals 65, 67, 65', 67', 68, 70, and 68', 70' are in turn connected by leads indicated generally at 79 to terminals (not shown) on the case for connection in a Wheatstone bridge arrangement in a manner well understood in the art.

Assuming the instrument is accelerated in the direction indicated by the arrow 80 in Fig. 1, the inertia of mass 52 causes the beam 50 to deflect about a knife edge 45 as pivot point, with the outer portion 54 of the beam beyond said pivot point deflected downward as indicated by the dotted lines in Fig. 1, and the inner short portion 55 of the beam deflected upward as shown by the dotted lines in Fig. 1.

Thus, the downward displacement of mass 52 as seen in dotted lines in Fig. 1 is substantially greater than the upward displacement of post 60 and the pins 63, 64 and 63', 64', carried thereon, and the corresponding extension of strain wires 75 and 77 as result of upward displacement of pins 63 and 63' with respect to the fixed pins 66 and 66'. The strain on wires 75 and 77 is thus increased due to the extension of such wires under the above conditions, while the wires 76 and 78 are relaxed due to displacement of pins 64 and 64' toward the fixed pins 69 and 69', and the relative change in resistance of the wires corresponding to the acceleration imparted to the instrument is indicated by the bridge circuit in a well known manner.

Should the instrument be accelerated in a direction opposite to that indicated by the arrow 80 in Fig. 1, the cantilever beam 50 will be deflected in the oppsite direction to that indicated by the dotted lines in Fig. 1, causing the short inner portion 55 thereof to be deflected downward, carrying pins 64 and 64' away from pins 69 and 69', and pins 63 and 63' towards pins 66 and 66'. This increases the tension in wires 76 and 78 while decreasing the tension in wires 75 and 77, such condition being indicated by the bridge circuit as described above.

In Figs. 8 to 11 is shown a modification of the device of Figs. 1 to 6. A base 85 is mounted by suitable means such as by bolts, welding or the like in a case 86. An elongated cantilever beam 87 similar to beam 50 is clamped at one end between brackets 88 by a screw 89, the brackets being mounted on the base 86. The outer end of the cantilever 87 carries a mass 90 fixed to the beam by a fastener 90' and the beam is pivoted intermediate its ends on a leaf spring type Cardan suspension 91. The pivoted mounting is composed of angularly placed lugs 92 mounted on the frame member 85 by suitable means such as bolts 92'. Secured to the angular lugs by means of clamps 93 and bolts 94 passing through them is the V-shaped spring 91 having a planar base 95, the angles formed by the legs 96 of the V and the base being equal.

The base of the spring 91 is connected by a screw 96' to a mounting 97 on the beam 87. The beam 87 can thus pivot about mounting 97 on the spring 91, said beam being spaced from the base member 85. The base 95 of the spring 91, to which the beam 87 is connected, functions as a pivot for the beam, similarly to the beam pivot formed by the knife edges 45 in the device of Fig. 1, that is, pivot 95 permits flexure of from 87 on both sides of the pivot 95 on the application of a force to said beam. The pivotal motion of the outer portion 98 of beam 87 is limited by two opposite adjustable limit motion stop screws 99 and 100, screw 99 being mounted on one of the lugs 92, and screw 100 on an oppositely positioned lug 101 connected to base 85 by means of bolt 101'. The pivotal motion of the inner end 102 of beam 87 is limited by two similar oppositely positioned limit motion screws 103 and 104 on the other lug 92, and a fourth opposite lug 105 connected to base 85 in the same member as lugs 92 and 101.

Mounted on the inner portion 102 of cantilever beam 87, between stop screws 103 and 104 and brackets 88, is a post 110 carrying insulated pins 111 and 112. On opposite sides of post 110, and connected to the bottom of case 86 by screws 112' are a pair of brackets 113 and 114, supporting at their upper ends a pair of blocks 113' and 114', respectively. Block 113' carries a central pin 115 and two terminals 116, and block 114' carries a central pin 117 and two terminals 118. Pins 111, 112, 115 and 117 are in transverse alignment with respect to the axis of beam 87. A strain wire 119 is looped in tension between pins 111 and 115, and is attached at its ends to terminals 116, and a strain wire 120 is looped in tension between pins 112 and 117, the ends of the wires being connected to terminals 118.

Post 110 also carries a pair of depending insulated pins 111' and 112' in alignment with pins 111 and 112; block 113' carries a depending pin 115' and a pair of depending terminals 116', in alignment with pin 115 and the terminals 116, respectively; and block 114' carries a depending pin 117' and two depending terminals 118', in alignment with pin 117 and terminals 118, respectively. A strain wire 119' is wound in tension between pins 111' and 115' directly below wire 119, and is connected at its ends to terminals 116'; and a strain wire 120' is looped in tension between pins 112' and 117' directly below wire 120, the ends of the wires being connected to terminals 118'.

The strain wire terminals are connected by leads 121 to terminals 122 on the outer sides of the blocks 113' and 114', and the latter terminals are in turn connected by leads (not shown) in a bridge circuit in a known manner. The case 86 has a cover 123 adjustably connected to the case by means of screws 124.

The instrument illustrated in Figs. 7 to 11 operate in a manner similar to that described above with respect to the embodiment of Figs. 1 to 6, except that beam 87 pivots about center 95 of the Cardian spring suspension 91 instead of knife edges 45. Thus, on deflection of beam 87 due to acceleration of the instrument up or down as viewed in Fig. 8, the inner portion 102 of beam 87, between screw 96, and brackets 88, will deflect in one direction about pivot 95, and the outer portion 98 of the beam will deflect in the opposite direction about pivot 95. Such deflection of the inner portion 102 of the beam will carry post 110 and the pins 111, 111' and 112 and 112' mounted thereon either toward or away from pins 115, 115' and 117, 117' respectively, causing an increase in tension in wires 119, 119' and a relaxation of wires 120, 120', or vice versa.

It will be understood that instead of employing a mass such as 52 or 90, connected to the free outer portion of the flexible beam, I may connect this portion of the beam to a rod or bellows, and thus convert the instrument from an accelerometer as described above, to a device for measuring force or pressure.

From the foregoing, it is seen that I have designed a motion sensing device, e. g., in the form of an accelerometer, in which the variation in tension of the strain wires can be made different from, e. g., substantially smaller than, the displacement of the mass, on subjecting the mass to a force or acceleration causing movement thereof. Thus, I can increase the range and sensitivity of the instrument. By adjusting the pivot of the beam and the spring constant or stiffness of the cantilever beam, e. g., 50 or 87, in the above described embodiments, relative to the strain wires, I can also maintain for any desired maximum variation of extension of the wires to be obtained upon a maximum chosen acceleration, any desired displacement of the mass.

It will be understood that instead of an electrical strain wire transducer, I can employ other types of transducers such as an inductive type transducer as described in copending application Serial No. 328,416, filed December 29, 1952, of Louis D. Statham, now Patent No. 2,778,623.

While I have described a particular embodiment of my invention for the purpose of illustration, it should be understood that various modifications and adaptations

I claim:

1. A motion sensing device which comprises a frame, a flexible beam, said beam having a movable end and a stationary section spaced from said movable end, a pivot member connected to said beam and positioned intermediate said movable end and said stationary section of said beam, a mounting for said pivot member, said mounting being connected to said frame, a force summing member connected to the movable end of said beam, and a motion sensing means connected to said beam between said pivot member and said stationary section of said beam.

2. A motion sensing device which comprises a frame, a flexible beam, a connection between said beam and said frame, said beam having a free end and a fixed end, a pivot for said beam positioned intermediate the ends of said beam, a force summing member connected to the free end of said beam on the other side of said pivot from said connection, and a motion sensing means connected to said beam between said pivot and said fixed end of said beam.

3. A motion sensing device which comprises a frame, a flexible beam, said beam having a movable end, means for clamping a section of said beam spaced from said movable end, a pivot member connected to said beam and positioned intermediate said movable end and said clamped section of said beam, said pivot member permitting flexure of said beam on opposite sides of said pivot member, a mounting for said pivot member, said mounting being connected to said frame, a force summing member connected to the movable end of said beam, and a motion sensing means connected to said beam between said pivot member and said clamped section of said beam.

4. An accelerometer which comprises a frame, a flexible beam, said beam having a movable end and, means for clamping a section of said beam spaced from said movable end, a pivot member connected to said beam and positioned intermediate said movable end and said clamped section of said beam, said pivot member permitting flexure of said beam on opposite sides of said pivot member, a mounting for said pivot member, said mounting being connected to said frame, a mass connected to the movable end of said beam, and a motion sensing means connected to said beam between said pivot member and said clamped section of said beam.

5. A motion sensing device which comprises a frame, a flexible beam, said beam having a free end portion, a connection between the other end portion of said beam and said frame, a pivot member for said beam positioned intermediate the ends of said beam, a mounting for said pivot member, said mounting being connected to said frame, a force summing member connected to said free end portion of said beam, the distance between said force summing member and said pivot member being greater than the distance between said pivot member and said connection, a wire mounting connected to said beam between said pivot member and said connection, an unbonded electrical resistance strain wire connected to said wire mounting, and a connection between said wire and said frame.

6. An accelerometer which comprises a frame, a flexible beam, said beam having a free end portion, a connection between the other end portion of said beam and said frame, a pivot member for said beam positioned intermediate the ends of said beam, said pivot member permitting flexure of said beam on opposite sides of said pivot member, a mounting for said pivot member, said mounting being connected to said frame, a mass connected to the free end portion of said beam, the distance between said mass and said pivot member being greater than the distance between said pivot member and said connection, a wire mounting connected to said beam between said pivot member and said connection, an unbonded electrical resistance strain wire connected to said wire mounting, and a connection between said wire and said frame.

7. A motion sensing device which comprises a frame, a flexible beam, said beam having a free end portion, a connection between the other end portion of said beam and said frame, a knife edge pivot member for said beam positioned intermediate the ends of said beam, said beam being disposed closely adjacent said pivot member, said pivot member permitting flexure of said beam on opposite sides of said pivot member, a mounting for said pivot member, said mounting being connected to said frame, a force summing member connected to the free end portion of said beam, a wire mounting connected to said beam between said pivot member and said connection, an unbonded electrical resistance strain wire connected to said wire mounting, and a connection between said wire and said frame.

8. An accelerometer which comprises a frame, a flexible beam, said beam having a free end portion, a connection between the other end portion of said beam and said frame, a knife edge pivot member for said beam positioned intermediate the ends of said beam, said pivot member permitting flexure of said beam on opposite sides of said pivot member, said beam being disposed closely adjacent said pivot member, a mounting for said pivot member, said mounting being connected to said frame, a mass connected to the free end portion of said beam beyond said pivot member, a wire mounting connected to said beam between said pivot member and said connection, an unbonded electrical resistance strain wire connected to said wire mounting, and a connection between said wire and said frame.

9. A motion sensing device which comprises a frame, a flexible beam, said beam having a free end portion, a connection between the other end portion of said beam and said frame, a knife edge pivot member for said beam positioned intermediate the ends of said beam, said beam being disposed closely adjacent said pivot member, a mounting for said pivot member, said mounting being connected to said frame, a force summing member connected to the free end portion of said beam, the distance between said force summing member and said pivot member being greater than the distance between said pivot member and said connection, pins connected to said beam between said pivot member and said connection, pins connected to said frame, and unbonded electrical resistance strain wires connected in tension between the pins on said beam and the pins on said frame.

10. An accelerometer which comprises a frame, a flexible beam, said beam having a free end portion, a connection between the other end portion of said beam and said frame, a pivot member for said beam positioned intermediate the ends of said beam, said beam being disposed closely adjacent said pivot member, a spring mounting for said pivot member, said mounting being connected to said frame, a mass connected to the free end portion of said beam, pins connected to said beam between said pivot member and said connection, pins connected to said frame, and unbonded electrical resistance strain wires connected in tension between the pins on said beam and the pins on said frame.

References Cited in the file of this patent

UNITED STATES PATENTS

| | | |
|---|---|---|
| 1,687,507 | Perkins | Oct. 16, 1928 |
| 2,424,864 | Treseder | July 29, 1947 |
| 2,487,681 | Weisselberg | Nov. 8, 1949 |
| 2,519,015 | Bensen | Aug. 15, 1950 |
| 2,573,285 | Statham | Oct. 30, 1951 |